United States Patent Office 3,043,805
Patented July 10, 1962

3,043,805
POLYMERIC AMIDES AND THEIR PREPARATION
Marion Burg, Metuchen, N.J., assignor to E. I. du Pont de Nemours and Company, Wilmington, Del., a corporation of Delaware
No Drawing. Filed Aug. 5, 1958, Ser. No. 753,196
10 Claims. (Cl. 260—72)

The invention relates to new polymeric compounds and more particularly to intralinear polyamides having lateral or extralinear unsaturated N-acryloxymethyl or N-alkacrylyloxymethyl groups including polyester amides, and to their preparation.

Various unsaturated polyamides and polyesteramides, typified by N-alkenoxymethyl polyamides are known. They are useful in making insoluble plastic products by addition polymerization including photopolymerization. However, the polymerization takes place at a relatively slow rate which is probably due to the fact that lateral unsaturated groups are joined through an ether linkage to the —CH$_2$— group on the intralinear nitrogen atoms.

An object of this invention is to provide a new class of unsaturated polyamides. Another object is to provide such compounds which form addition polymers rapidly. A more specific object is to provide new laterally unsaturated polyamides which undergo addition polymerization by means of addition polymerization initiators activated by actinic light at a relatively rapid rate. A further object is to provide such compounds which are useful in the preparation of printing plates. A still further object is to provide a process of preparing such products in a simple and effective manner. Still other objects will be apparent from the following description.

The laterally unsaturated polyamides of this invention can be made by reacting (1) a water-soluble N-alkoxymethyl polyamide containing alkoxymethyl groups on 10% to 45% of the amido nitrogen atoms, and preferably one wherein said alkoxy radical contains 1 to 5 carbon atoms, e.g., methoxy, ethoxy, propoxy, butoxy and pentoxy, with (2) an esterifying agent containing a radical of the formula

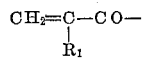

wherein R$_1$ is hydrogen, an alkyl radical of 1 to 5 carbon atoms, e.g., methyl, ethyl, propyl, butyl and pentyl, or a halogen atom, e.g., chlorine, in the presence of (3) a small amount of a thermal addition polymerization inhibitor and a solvent or diluent, if necessary or desired, for a period sufficient to introduce extralinear radicals of such formula into the polyamide. Suitable esterifying agents include acrylic, α-alkylacrylic and α-chloroacrylic acid and the corresponding acid chlorides, bromides and anhydrides. The reaction can be carried out at practical speeds at temperatures above 30° C. and generally less than 80° C. and usually requires from 30 minutes to 2 hours. The resulting unsaturated polyamide is separated from the reaction medium, washed with the precipitant, e.g., acetone, filtered, and dried. The laterally unsaturated polyamide, usually a white solid, is soluble to the extent of at least 15% by weight in water/ethanol mixtures containing 25% or more by weight, of water. The polyamide, moreover, is insoluble in chlorinated hydrocarbon solvents, e.g., chloroform, carbon tetrachloride, trichloroethylene.

The soluble unsaturated polyamides of this invention may vary widely in molecular weight, e.g., from about 5000 to more than 50,000.

The preferred soluble laterally unsaturated polyamides have a molecular weight in excess of 10,000, an intrinsic viscosity of at least 0.4 (as defined in U.S. Patent 2,130,948) and at least 80% by weight of the polymer consists of recurring intralinear units having a unit length of at least 7, where "unit length" is defined as in U.S. Patents 2,071,253 and 2,130,948. These linear polyamide units, furthermore, contain recurring amide groups of the formula:

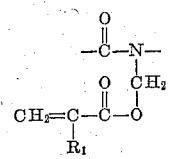

wherein R$_1$ is hydrogen or an alkyl radical of 1 to 5 carbon atoms, or halogen. In the preferred compounds R$_1$ is hydrogen or methyl. The laterally unsaturated group will be present on at least 2% up to about 42% of the intralinear amido nitrogen atoms, namely, those which carried the N-alkoxymethyl groups, any remaining substituents being alkoxymethyl groups.

N-alkoxymethyl polyamides suitable for making the unsaturated polyamides described above are described in U.S. Patents 2,412,993, 2,430,860 and 2,430,866. In general, they are prepared by reacting (a) a linear carbonamide of high molecular weight, preferably one having a molecular weight of at least 10,000 and an intrinsic viscosity of at least 0.4 and containing hydrogen-bearing amide groups as an integral part of the main polymer chain with (b) formaldehyde, and (c) a formaldehyde-reactive organic compound having hydrogen attached to an element of groups V and VI of series 2 and 3 of the periodic table, particularly an alcohol or mercaptan, in the presence of a catalyst consisting essentially of oxygen-containing acid having an ionization constant at least as great as $9.6 \times 10^{-6}$ and an equivalent conductance, measured at 25° C. in 0.01 N concentration, no greater than 370 ohms$^{-1}$cm.$^2$. In general, formaldehyde is used in an amount from 50 to 100% by weight of the polycarbonamide, and the alcohol in an amount from 1 to 2 moles per mole of formaldehyde and the reaction mixture heated to between 30° C. and 100° C. until at least 10% up to about 45% of the hydrogen-bearing amide groups have reacted to yield alkoxymethyl substituent groups.

The invention is further illustrated but is not intended to be limited by the following examples.

Example I

To a stirred mixture of 80 g. N-methoxymethyl polyhexamethylene adipamide having an intrinsic viscosity of about 1 and having methoxymethyl groups on at least 45% of the amido nitrogen atoms, 1.6 g. di-tert-butyl p-cresol, and 160 ml. methacrylic acid there were added 200 ml. chloroform and 60 ml. methacrylic anhydride. The mixture was heated on a steam bath at a reaction temperature of 68° to 71° C. for 1 hour. The solution was cooled, and the resulting polyamide containing extralinear methacrylyl groups was precipitated by slowly adding 1.5 liters of acetone. The resulting white and swollen polyamide was isolated by decanting the fluid through nainsook; it was purified by slurrying twice with acetone, 1 liter of acetone being used each time, and once with ether. It was then dried in air to yield 75 g. of a white fluffy solid, N-methacrylyloxymethyl polyhexamethylene adipamide having methacrylyloxymethyl groups on about 35% of the intralinear amido nitrogen atoms and alkoxymethyl groups on about 10% of said atoms.

Example II

A mixture of 20 g. N-methoxymethyl polyhexamethylene adipamide, having an intrinsic viscosity of about 1 and methoxymethyl groups on at least 45% of the amido nitrogen atoms, 0.4 g. di-tert-butyl p-cresol, 40 ml. methacrylic acid, 80 ml. chloroform, and 15 ml. methacrylic anhydride was heated, with stirring, on a steam bath at 67–72° C. for 1 hour. The resulting polymer was isolated by precipitating and washing with acetone and dried in air to yield 18.5 grams of solid.

This solid polymer, N-methacrylyloxymethyl polyhexamethylene adipamide, having methacrylyloxymethyl groups on at least 35% and methoxymethyl groups on about 10% of the intralinear amido nitrogen atoms was dissolved in 80 ml. ethanol by stirring at 50–65° C. for 40 minutes. It was filtered hot through nainsook, 0.19 g. benzoin methyl ether dissolved in a small amount of ethanol was added, and the mixture was stirred for 5 minutes at 45–50° C. The hot solution was cast on a glass plate provided with a paper dam to prevent the solution from running over the edge of the plate. The solution was allowed to evaporate in the dark for 7 days. A clear, tough, flexible film about 70 mils (1.8 mm.) thick was formed. A portion of the sheet was bonded to an aluminum base 15 mils (0.38 mm.) thick by means of the "Scotch-Weld" adhesive made by the Minnesota Mining and Manufacturing Co. (a butadiene/acrylonitrile copolymer combined with a phenol/formaldehyde resin). This adhesive, a yellowish-brown material, also served as an anti-halation layer. Its light transmission is 0 at wavelengths less than 440 mμ and, at wavelengths from 450 to 550 mμ, is in accordance with the following table:

| λ (mμ): | Percent transmission |
|---|---|
| 450 | 0.1 |
| 460 | 0.1 |
| 470 | 1.3 |
| 480 | 3.0 |
| 490 | 6.1 |
| 500 | 9.0 |
| 510 | 12.1 |
| 530 | 17.8 |
| 550 | 23.1 |

The photopolymerizable layer thus prepared was exposed in a vacuum frame to a 2000-watt high-pressure mercury-arc lamp through a process negative containing a letter-text image for 7 minutes at a distance of 6 inches and developed for 10 minutes in ethanol at 40–45° C. A sharply defined relief image was obtained.

*Example III*

A mixture of 15 g. N-methoxymethyl polyhexamethylene adipamide, having an intrinsic viscosity of about 1 and methoxymethyl groups on at least 45% of the amidonitrogen atoms, 75 ml. acrylic acid, and 0.30 g. hydroquinone was stirred at room temperature for 15 minutes and then placed in an oil bath preheated to 130° C. After 20 minutes, during which time the reaction temperature reached 75–80° C., the solution was cooled to 60° C., and a white fibrous solid was precipitated upon addition to 500 ml. acetone. The solid was slurried with three 300 ml. portions of acetone, pulverized in a high-speed comminuting and blending apparatus (U.S. Patent 2,109,501) with three 350 ml. portions of acetone, and washed with 150 ml. acetone after each comminuting treatment. After the material was dried in air, 14 g. of white powder, N-acrylyloxymethyl polyhexamethylene adipamide, was obtained. A similar yield of N-acrylyloxymethyl polyhexamethylene adipamide was obtained to room temperature (26°), after a period of 20 hours. A solution of 2 g. of the polyamide thus obtained in 20 ml. of ethanol containing 0.02 g. benzoin methyl ether as a photoinitiator was poured on a glass plate to a depth of 200 mils, spacers at such thickness around the edges of the plate preventing the solution from flowing off, and the ethanol was allowed to evaporate overnight at room temperature to give a photosensitive layer about 20 mils in thickness. The dry sheet was bonded to a 15-mil sheet of aluminum and exposed to ultraviolet radiation from twenty 30-watt fluorescent lamps as described in Example II. A relief image was obtained upon development in ethanol at 45° C.

In place of the particular N-alkoxymethyl polyamide reactant of the preceding examples, there can be substituted other such polyamides including those described in the above patents and in U.S. Patents 2,430,867, 2,430,875, 2,430,908, 2,430,910, 2,430,923 and 2,441,057, and which can be made from the reactants disclosed in such patents. Suitable additional polyamide reactants include polyhexamethylene sebacamide, polydecamethylene adipamide, polydecamethylene sebacamide, and polyhexamethylene adipamide - polyhexamethylene sebacamide. These are preferably treated with formaldehyde and methanol to produce a methoxymethyl-substituted polyamide.

In place of the specific unsaturated acid compound reactants described in the foregoing examples, there can be substituted alpha-chloroacrylic acid, alpha-ethylacrylic acid, alpha-isopropylacrylic acid and the corresponding acid chlorides, bromides and anhydrides.

The reaction occurs only on the amido nitrogen atoms carrying the alkoxymethyl groups. For example, where the original N-alkoxymethyl polyamide contains 10% alkoxymethyl groups a product which can be formed will contain 2% extralinear unsaturated groups and 8% alkoxymethyl groups. When reference is made to N-alkoxymethyl polyamides containing 45% alkoxymethyl groups, these novel polyamides contain at least 2 to 42% extralinear unsaturated groups leaving 43 to 3% alkoxymethyl groups respectively.

Various well known inhibitors of addition polymerization such as hydroquinone, hydroquinone monomethyl ether, and di-tert-butyl p-cresol are useful, and in amounts of about 0.1% to 0.5% by weight of the acrylic or alpha-substituted acrylic acid, in preventing thermal polymerization of the N-acrylyloxymethyl or alpha-substituted N-acrylyloxymethyl polyamide during its process of preparation.

Although the unsaturated polyamides of this invention can be prepared at room temperatures with a long reaction time, of the order of 20 hours, elevated temperatures will ordinarily be chosen, and the practical reaction temperatures are approximately 40 to 80° C. and preferably 60 to 75° C. Above about 80° C. thermal polymerization may occur in spite of the presence of the thermal inhibitors.

Particularly when the acrylating agent is methacrylic acid, it is desirable to use a mixture of the acid and its anhydride rather than the acid alone. The ratio of acid to anhydride by volume should be between 4 to 1 and 1 to 1, and preferably about 3 to 2. In any event, the desirable ratio of acid, or acid and anhydride when this mixture is used, to the N-alkoxymethyl polyamide is at least 2 to 1 and may be as high as 6 to 1 parts by weight. (Although the quantities of the acids and anhydrides used in the examples are given by volume, the difference from the amount by weight is not significant in the present application because the densities of the acids and anhydrides are close to that of water.)

In order to prevent gelation by higher temperatures of the polymer produced, it is desirable to use an inert liquid, e.g., chloroform, as a diluent. Other useful diluents include methylene chloride and carbon tetrachloride. Amounts of diluent at least 1.2 times as great as the volume of acid, including the anhydride when this is used, have proved satisfactory, and amounts up to 1.7 times the amount of acid, or acid and anhydride, are practical.

The reaction should be continued only so long as necessary to produce the desired product. Otherwise, upon prolonged heating, gelation (addition polymerization) is likely to occur. Reaction times of about an hour at the preferred temperatures are satisfactory although the unsaturated polyamides may form in as little as fifteen minutes. Reaction times greater than 1½ hours are appropriate when the amount of diluent is sufficient to assure the maintenance of the adequately low reaction temperature and the amount of inhibitor is also sufficient.

Although it will ordinarily be desired to cause polymerization of the present compounds by ultra-violet light in the presence of photoinitiators, because selective polymerization in different areas can be accomplished thereby, it is also possible to polymerize them by incorporating a thermal initiator such as benzoyl peroxide and heating to approximately 70° C.

The unsaturated polyamides of this invention, e.g., the N-acrylyloxymethyl and N-methacrylyloxymethyl polyamides, are useful for numerous purposes where it is desirable to have a solvent-insoluble and non-thermoplastic composition. They can form durable protective coatings and non-solvent-sensitive adhesives. They are useful for forming shaped plastic toys, ornaments and other objects by means of thermal polymerization and molding apparatus. They are especially advantageous where it is desired to apply such a composition in a pattern, design or image utilizing photopolymerization. Photo-mechanical resists for lithography and other printing purposes may be prepared by their use, as can plastic printing plates for use on flat bed or rotary printing presses. The N-methacrylyloxymethyl and N-acrylyloxymethyl polyamides, for example, are especially applicable to the latter purpose when they are combined with a compatible polymerizable component such as a mono- or dimethacrylate or a dimethacrylamide after the manner taught in Plambeck U.S. Patent 2,760,863. The compounds may also be used for affixing phosphors to surfaces to provide color television screens as described in Swindells French Patent No. 1,444,092, délivré April 23, 1957, or to form indicia on instrument panels. They may also be employed for the application of designs for various decorative purposes.

An advantage of the compounds of the present invention is that they polymerize rapidly and in themselves are capable of forming tough images and coatings. In addition, they may be combined with polymerizable monomers to photopolymerize still more rapidly and to give sharp, tough, strong, durable images of greater depth, as in printing plate applications.

This application is a continuation-in-part of application Serial No. 628,978, now abandoned.

What is claimed is:

1. A synthetic linear laterally-unsaturated polycarbonamide in which the carbonamide groups are intralinear groups in the main polymer chain, said polycarbonamide having a molecular weight of at least 5000, an intrinsic viscosity of at least 0.4 and at least 80% of the polycarbonamide consisting of recurring intralinear units having a unit length of at least 7, wherein at least 55% of the amido groups are unsubstituted, being present in intralinear carbonamide groups of the formula:

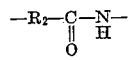

where $R_2$ is a hydrocarbon radical, said polycarbonamide containing as an integral part of the main polymer chain recurring intralinear groups of the formula:

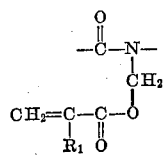

wherein $R_1$ is a member taken from the group consisting of hydrogen, chlorine and alkyl radicals of 1 to 5 carbon carbon atoms, the

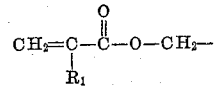

groups being present on at least 2% up to about 42% of the intralinear amide groups, any remaining substituents on the amido-nitrogen atoms on the polymer chain being —CH$_2$—OR groups where R is an alkyl radical of 1 through 5 carbon atoms.

2. A process for making a laterally-unsaturated polycarbonamide which comprises reacting (1) a water-soluble N-alkoxymethyl polycarbonamide containing 1 to 5 carbon atoms in the alkoxy group, said polycarbonamide having a molecular weight of at least 5000, an intrinsic viscosity of at least 0.4 and at least 80% of the polycarbonamide consisting of recurring intralinear carbonamide units having a unit length of at least 7 wherein the alkoxymethyl substituted groups constitute at least 10% up to 45% of the intralinear amide groups of the polycarbonamide, the remaining intralinear carbonamide groups being unsubstituted groups of the formula:

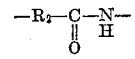

where $R_2$ is a hydrocarbon radical, with (2) at least one esterifying compound being selected from the group consisting of acids, acid anhydrides, acid chlorides and acid bromides containing a radical of the formula:

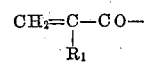

wherein $R_1$ is a member taken from the group consisting of hydrogen, alkyl of 1 to 5 carbon atoms and chlorine, in the presence of (3) a small amount of a polymerization inhibitor at a temperature less than 80° C. and for a period sufficient to provide acrylyloxymethyl groups on at least 2% up to 42% of the intralinear amide groups.

3. A polyamide as defined in claim 1 wherein said polymer is soluble to the extent of at least 15% by weight in aqueous ethanol containing at least 25% by weight of water and is insoluble in carbon tetrachloride.

4. A polyamide as defined in claim 1 which is a polyhexamethylene adipamide and wherein $R_1$ is methyl.

5. A polyamide as defined in claim 1 which is a polyhexamethylene adipamide and wherein $R_1$ is hydrogen.

6. A process as defined in claim 2 wherein said process is carried out at 60° C. to 80° C. for a period of ½ to 2 hours.

7. A process as defined in claim 2 wherein a mixture of methacrylic acid and methacrylic anhydride is used as the esterifying agent.

8. A process as set forth in claim 2 wherein a mixture of acrylic acid and acrylic anhydride is used as the esterifying agent.

9. A process as defined in claim 2 wherein said N-alkoxymethyl polyamide is N-methoxymethyl polyhexamethylene adipamide.

10. A process as defined in claim 2 wherein said N-alkoxymethyl polyamide is N-methoxymethyl polyhexamethylene sebacamide.

References Cited in the file of this patent
UNITED STATES PATENTS

| | | |
|---|---|---|
| 2,451,672 | Gray | Oct. 19, 1948 |
| 2,474,923 | Watkins | July 5, 1949 |
| 2,456,271 | Graham | Dec. 14, 1958 |
| 2,871,223 | Hankins et al. | Jan. 27, 1959 |